United States Patent
Booth et al.

[11] Patent Number: 5,835,533
[45] Date of Patent: Nov. 10, 1998

[54] COMMUNICATIONS IN A DISTRIBUTION NETWORK

[75] Inventors: Andrew John Booth, Bishop's Stortford; Graham Ainsley Dolman, Saffron Walden, both of United Kingdom

[73] Assignee: Northern Telecom Limited, Montreal, Canada

[21] Appl. No.: 837,435

[22] Filed: Apr. 17, 1997

[30] Foreign Application Priority Data

Apr. 20, 1996 [GB] United Kingdom ............... 9608233

[51] Int. Cl.⁶ ............................................. H03H 7/30
[52] U.S. Cl. ......................... 375/235; 375/232; 455/3.1; 455/5.1; 370/442; 370/465
[58] Field of Search ............................ 375/229, 232, 375/235, 266, 278, 284, 285; 455/3.1, 5.1, 6.1, 67.1, 67.3; 370/442, 465, 480, 485, 486

[56] References Cited

U.S. PATENT DOCUMENTS 3,696,203 10/1972 Leonard ................................. 375/232
5,696,765 12/1997 Safadi ..................................... 370/436
5,717,717 2/1998 Yang et al. ............................. 375/232
5,717,861 2/1998 Rabii ...................................... 395/200

Primary Examiner—Wellington Chin
Assistant Examiner—Congvan Tran
Attorney, Agent, or Firm—Lee, Mann, Smith, McWilliams, Sweeney & Ohlson

[57] ABSTRACT

In a distribution telecommunications system, channel data for performing equalisation on a channel between a central station and an outstation is determined from measurements on pairs of pulses transmitted from the outstation. Each pulse pair comprises a first in-phase pulse and a second quadrature pulse having a predetermined time/phase separation. Coefficients for an active filter provided at the outstation are calculated from the multipath transmissions of the pulses and from the received time/phase separation of those pulses. The filter is then used to pre distort signals transmitted from the outstation.

11 Claims, 5 Drawing Sheets

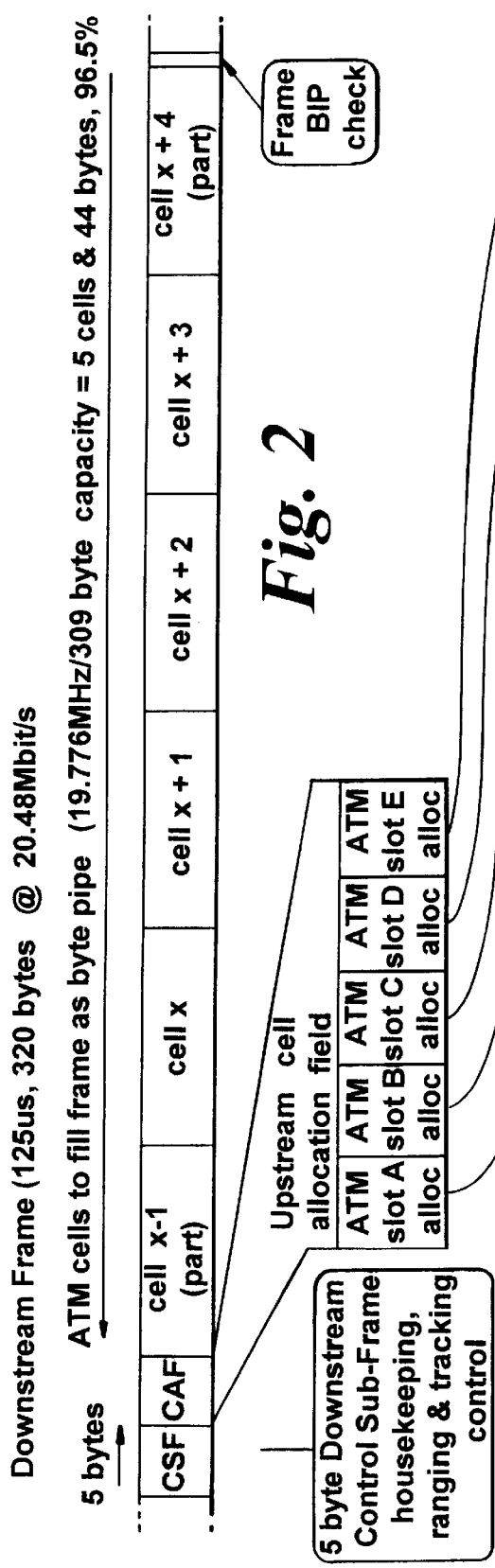
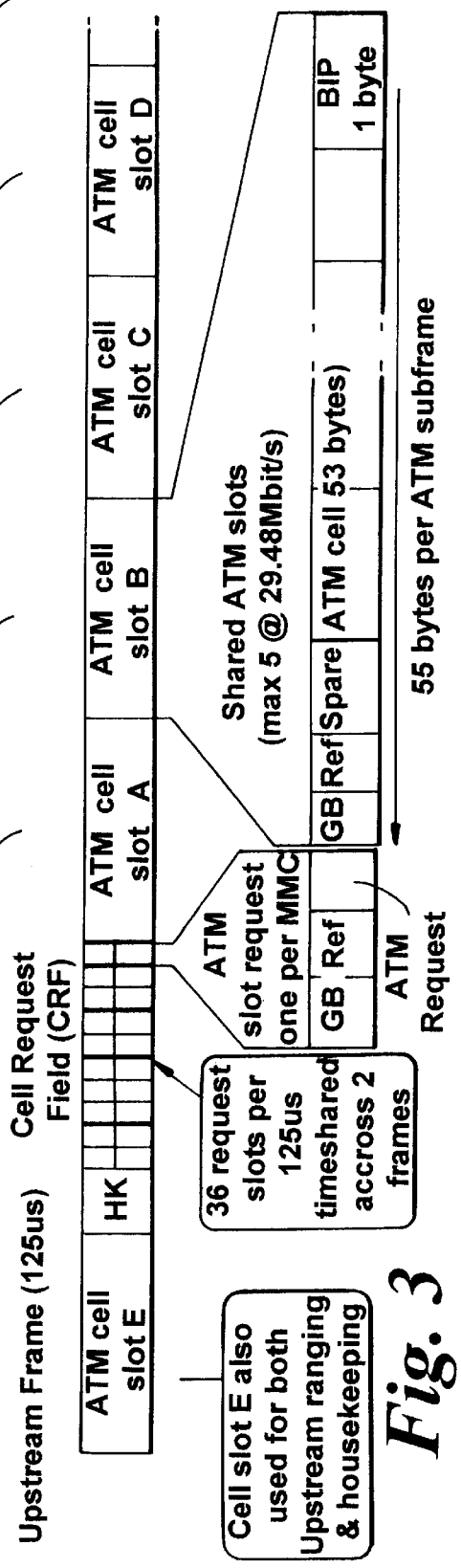
Fig. 2
Fig. 3

COMMUNICATIONS IN A DISTRIBUTION NETWORK

This invention relates to communications in a distribution network, and more particularly to bi-directional communications in a distribution network in which a central or distribution station communicates with a plurality of remote terminals on a point to multipoint basis.

BACKGROUND OF THE INVENTION

Distribution networks, for example cable television distribution networks, are well known. In such networks, analogue television signals are carried to customer terminals (television receivers) from a central station or head end via a branched coaxial cable which includes bridge amplifiers, line extenders, and customer taps. Each television signal occupies a typically 6 to 8 MHz channel at a frequency from about 50 MHz to about 750 MHz or more. The upper frequency is limited by the bandwidth of the bridge amplifiers and line extenders and the attenuation of the coaxial cable, which as is well known increases with increasing frequency. Various ways have been proposed for communicating additional signals via a cable television distribution network, typically involving the supply of such signals via optical fibres to appropriate points in the coaxial cable system with delivery of the signals to the customer premises via the coaxial cable, referred to as the drop cable, positioned between the customer tap to the customer premises. There is also a need to accommodate signals in the upstream direction from the customer premises to the central station, so that the network can then serve for communicating arbitrary types of signals in both direction. Such signals can include for example television program selection and control signals, metering signals, voice signals, and data signals.

In the downstream direction from the central station to the terminals, the cable distribution network constitutes a point to multipoint network, on which signal transmission is relatively easy to provide. In the upstream direction from the terminals to the central station, this network is a multipoint-to-point network, on which signal transmission is much more difficult to provide. One reason for the difficulty is the problem of contention among different terminals simultaneously wishing to transmit signals to the central station. Various collision detection schemes have been proposed generally for multipoint-to-point communications networks; these are not particularly suited to the cable distribution network, especially in view of the large number of terminals which may exist in such a network.

In addition, there can be a wide variation in the bandwidth which is required by each terminal, at any particular time, for transmitting signals in the upstream direction. For example, these signals can be isochronous (constant bit rate) signals, such as voice, metering, and video signals, and/or asynchronous (variable bit rate) signals, such as computer data signals, keyboard operations, and television push-button control signals. Providing for efficient transmission of these different types of signals from a large number of terminals is difficult.

In the past, systems of this type have generally employed a conventional TDMA protocol for the upstream transmission. In such an arrangement, a station wishing to transmit is allocated a time slot by the central station and occupies this time slot throughout the length of the transmission. This arrangement is however less than ideal as some of the terminals will have more data to transmit than can be easily accommodated in a single time slot wherein other terminals may have so little data that the occupied time slot is underused. A solution to this problem is to provide asynchronous transfer mode (ATM) transmission between the customer station and the central station. While this technique has proved to be effective, difficulties have been experienced in its application to systems having dispersive channels between the customer stations and the central station. In such circumstances some form of channel equalization is required to reduce the bit error rate to an acceptable value. Current techniques of performing channel equalization are not directly applicable to ATM transmission to and from customer terminals as they involve a heavy data processing demand and also require a significant overhead which then limits the bandwidth that can be made available for revenue earning traffic.

The object of the invention is to minimise or to overcome these disadvantage.

A further object of the invention is to provide an improved system and method for providing communications over a distribution network.

SUMMARY OF THE INVENTION

According to one aspect of the invention there is provided a method of performing channel equalization in a distribution telecommunications system in which a plurality of outstations are coupled to a central station via a distribution network, the method including determining for each said outstation a measure of the channel distortion of the path between that outstation and the central station, storing at that outstation data corresponding to said measured channel distortion, and effecting from said stored data at the outstation equalization of signals transmitted from that outstation to the central station by corresponding pre distortion of said transmitted signals.

According to another aspect of the invention there is provided an arrangement for performing channel equalization in a distribution telecommunications system in which a plurality of outstations are coupled to a central station via a distribution network, the arrangement including means for determining for each said outstation a measure of the dispersion and of the frequency offset of the path between that outstation and the central station, storage means disposed at each said outstation for storing data corresponding to said measured dispersion and frequency offset for that outstation, and means disposed at the outstation for effecting from said stored data equalization of signals transmitted from that outstation to the central station by pre distortion of said transmitted signals.

By performing the equalization or pre distortion at the outstations rather than at the central station, the associated signal processing is distributed around the system thus removing a potentially heavy computational load from the central station and ensuring that the system can operate at a high speed. Further, the technique obviates the need for storage and rapid retrieval of large quantities of customer data at the central station. Typically, signalling between the outstation and the central station employs a differential quadrature phase shift keying (DQPSK) protocol. It will be appreciated that, in distribution networks such as cable TV systems, the channel distortion of any particular path will not change significantly over short time periods. We have thus found that channel distortion measurements can be performed much less frequently than is required in mobile systems where communication paths are constantly changing.

The use of equalization allows a reduction in the width of guard bands by reducing interference between adjacent signal bursts. Typically, guard times of only two symbol widths may be employed, and signal bursts may be as short as three symbols.

In some systems, equalization may be performed only at those customer terminals whose path dispersion exceeds a predetermined level thus further reducing the overall computational load.

Advantageously, the pulse sequences are transmitted by the outstation in response to a marshalling command transmitted by the base station. The in-phase and quadrature pulses may be transmitted each in an allocated slot in an ATM frame.

Typically, the channel distortion and frequency offset are determined in the form of coefficients which are applied to an adaptive filter provided at the outstation.

In a preferred embodiment, the channel characteristics required to perform equalization are determined from analysis of a sequence of an in-phase and a quadrature pulse transmitted over the path between the outstation and the central station.

The technique may be employed for performing equalization in a cable TV system by effecting pre distortion of transmitted signals to overcome multipath distortion.

BRIEF DESCRIPTION OF THE DRAWINGS

An embodiment of the invention will now be described with reference to the accompanying drawings, in which:

FIG. 2 illustrates a TDM frame structure for downstream signal in the system of FIG. 1;

FIG. 3 illustrates a corresponding TDM frame structure for upstream signals;

DESCRIPTION OF PREFERRED EMBODIMENT

Figure 1:
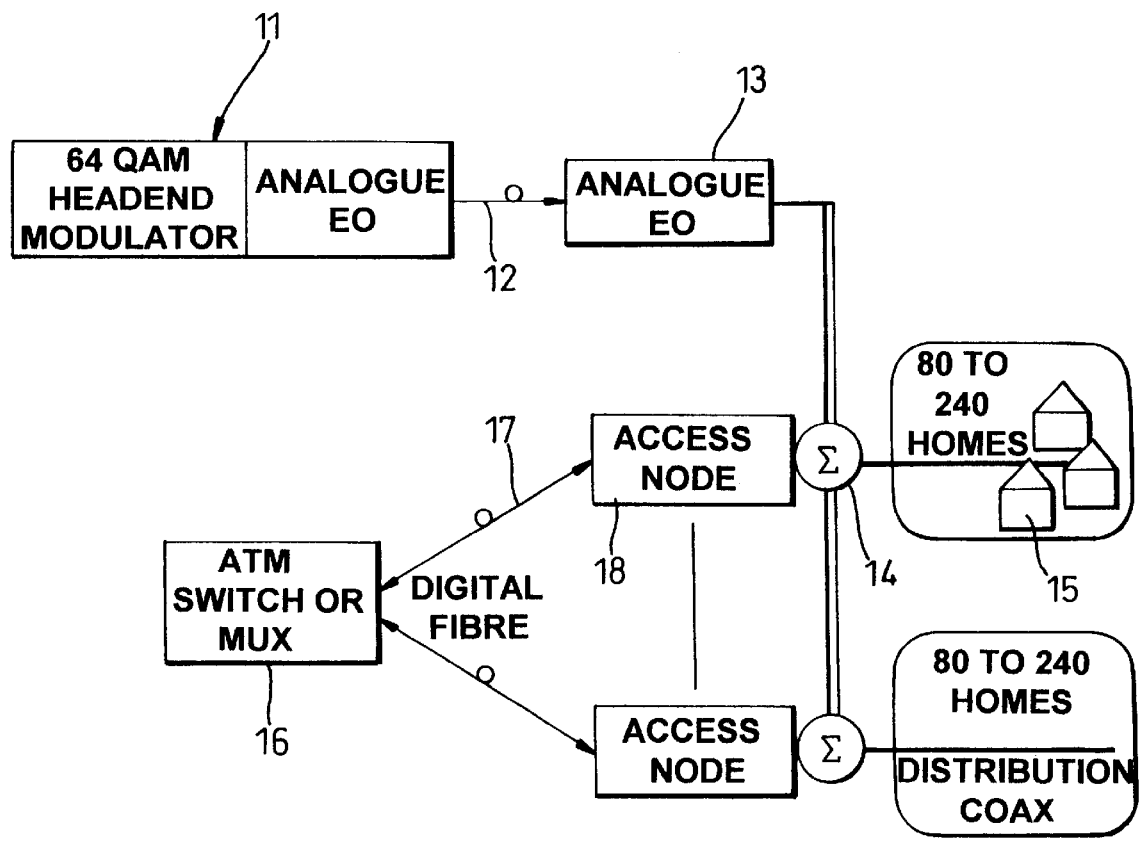
FIG. 1 illustrates a cable television distribution network which provides bi-directional communications in accordance with an embodiment of the invention.

Referring to FIG. 1, the communications system includes a head end 11 coupled with a fibre link 12 to an interface unit 13 serving several coax nodes 14 via a coaxial connection. Each node 14 serves a group of customer terminals 15, typically between 80 and 240, via a coaxial distribution network. The head end 11 provides analogue services such as cable television to the customer terminals via the distribution network.

Interactive services are provided to customer terminals via an ATM switch or MUX 16 coupled to an ATM network (not shown). The ATM switch is coupled to the coax node 14 via respective fibre links 17 and access node 18. All traffic for these interactive services, both upstream and downstream, flows through the respective access node.

Each coax node 14 communicates with its respective group of customer terminals via the coaxial network which thus provides a common bus. In the downstream direction the communication is point to multipoint, whereas in the upstream direction communication is multipoint to point.

In this arrangement each access node 18 functions as a local base or central station and the customer terminals served by node function as outstations.

As illustrated in FIGS. 2 and 3, communications traffic is carried in frames. Each downstream frame (FIG. 2) incorporates a number of ATM cells carrying traffic to the customer terminal, a live byte control sub frame (CSF) included for housekeeping purposes and which is also used for ranging and for tracking control, and a CAF field containing a series of ATM slot allocations which provide authorisation for transmission of cells by the customer station via the corresponding ATM cell slots of the subsequent upstream frame (FIG. 3). A frame BIP check field is also provided to identify transmission errors that may occur.

The upstream frame incorporates a header portion (cell slot E) which is used for upstream ranging and for housekeeping purposes, and a number of upstream ATM cell slots which have been allocated to customer terminals. The frame also includes a number (typically 36) of cell request slots which are sent by the customer terminals to request allocation of a slot in a subsequent downstream frame. Typically each frame occupies 125 microseconds giving a cycle time of 250 microseconds.

It will be seen from FIGS. 2 and 3 that the downstream transmission uses a TDM format while the upstream transmission uses a modified TDMA format in which customer terminals are allocated respective time slots but for that frame only. In a subsequent frame a "customer terminal" will in general be allocated a different slot or, on some occasions, will receive no allocation at all and will have to wait for an allocation in a later frame.

Figure 4:
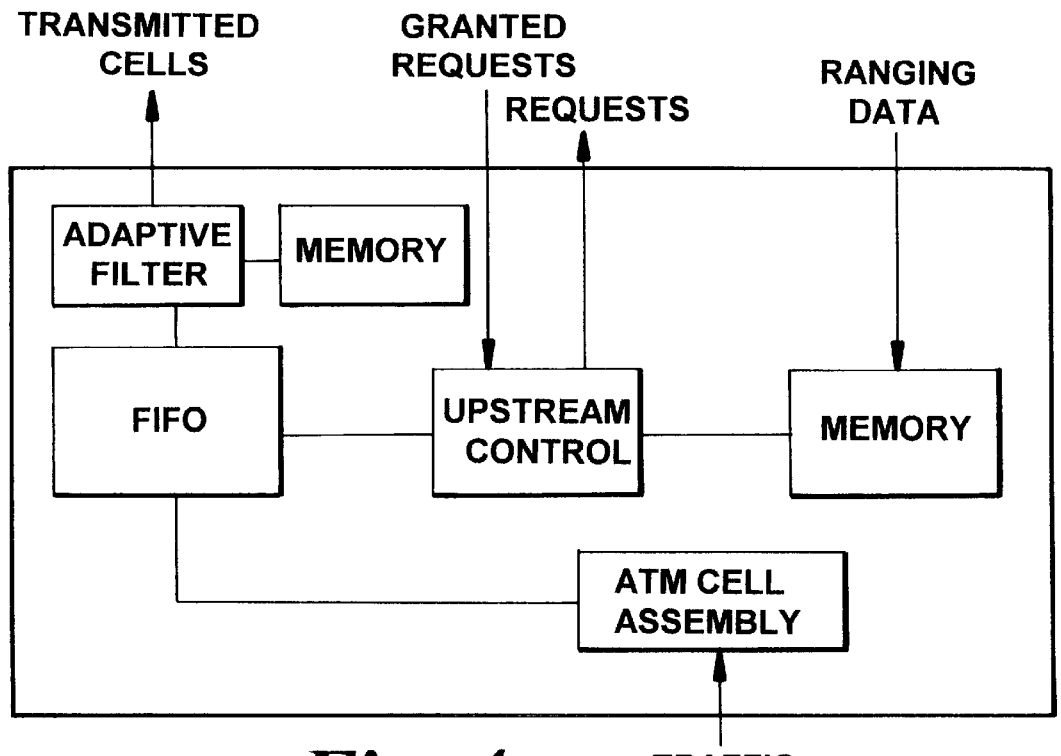
FIG. 4 is a schematic diagram of the customer terminal station of the system of FIG. 1.

In the customer terminal shown in FIG. 4, outgoing or customer traffic, e.g. video, voice or data traffic, is packed into ATM cells, each of which is provided with an appropriate header. These cells are then stored in sequential order in a FIFO buffer store to await transmission to the central station. Before a cell can be transmitted, the customer terminal sends a cell transmission request to the central station in response to a polling signal, and is thus offered time slots in alternate upstream frames in response to its allocation requests. In a preferred embodiment, each customer station is polled during alternate downstream frames. In this embodiment, one half of the customer stations may be polled in the even downstream frames and the other half in the odd downstream frames. Outgoing signals from the customer terminal are passed through an adaptive filter whose taps are fed with appropriate coefficients whereby to effect channel equalization of the path between the customer terminal and the access node. The determination of these coefficients will be described below. In contrast to conventional communications systems, channel equalization is performed at each transmitting outstation rather than at the receiving central station.

For simplicity, only the relevant parts of the upstream transmission portion of the customer terminal has been shown in FIG. 4.

Advantageously, the signalling between the customer terminal and the access node employs a differential quadrature phase shift keying (DQPSK) protocol. The request signal burst may comprise e.g. three DQPSK symbols which carry the request information in the form of two intersymbol transitions. This cell allocation signal burst is sent at a precisely defined time which is determined by the access node as will be discussed below. This transmission request signal comprises a short burst containing only a few symbols and having no preamble or timing sequence. Successive bursts are separated by a short guard band.

Figure 5:
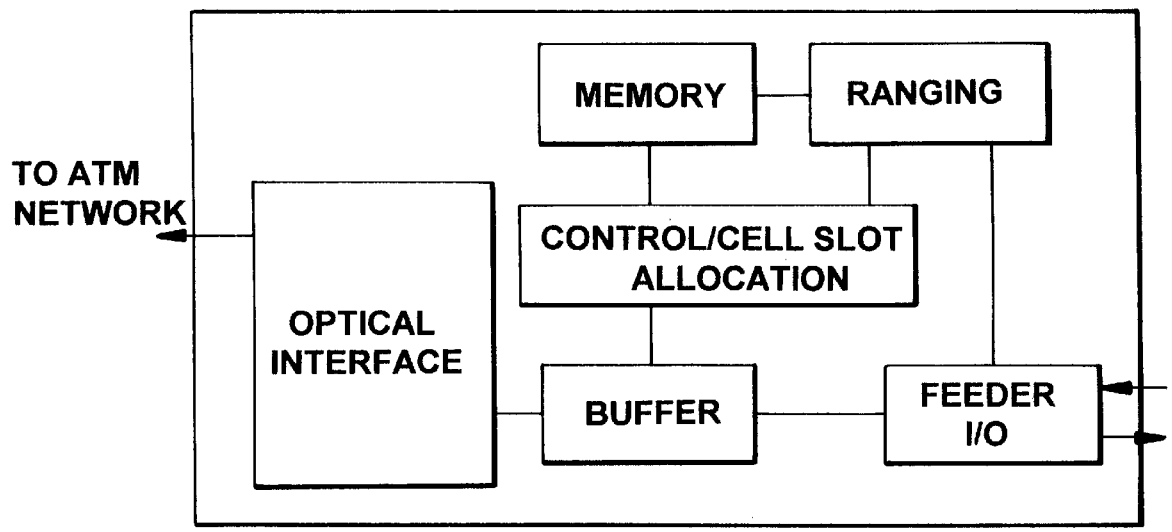
FIG. 5 is a schematic diagram of the access node equipment of the system of FIG. 1.

As shown in FIG. 5, the access node provides an optical interface to the ATM network (not shown) and controls the allocation of available upstream time slots in response to requests received via the feeder input/output circuit. The access node also incorporates ranging equipment for determining its effective distance from every customer terminal that it serves. Details of the served terminals are stored in a memory.

The call allocation request sent by a customer terminal to the access node may be a request for a single cell or for a number of cells depending on the length of the queue of cells awaiting transmission from that base station. Depending on the density of traffic within the system, the access node may be able to respond to a request for a number of cells with a corresponding number of allocations, or it may be able to fulfill only a smaller number of allocations in which case the remainder of the request will be fulfilled in one or more subsequent frames.

It will be appreciated that in a cable system, each terminal will have an effective time shift from the access node as a result of the electrical length of the coaxial transmission path therebetween. Also, the effective length of the path can vary in response to the transmission characteristics of the path. To overcome this, the access node (FIG. 5) performs a regular ranging measurement via the CSF slot of the downstream frame to each terminal in its service area so as to determine the timing offset of that terminal from the access node. Typically, each customer terminal has a ranging measurement performed every few seconds. This timing offset information is downloaded into a first storage area of a channel data memory in the customer terminal and corresponding customer data is stored in a memory in the access node. This data is used by an upstream control circuit in the customer terminal to time transmission of cell slot allocation requests to the correct position of the upstream frame such that the allocation requests received from customer terminals at the access node are in the correct sequence and in the correct time slots within the upstream frame. From the stored customer data, the access node can then readily identify the origin of each cell allocation request and can decode the request without the need for the provision of any identifying preamble sequence. This significantly reduces the time required for request processing as there is a reduction in the amount of overhead data in the frame and there is no requirement for storage at the access node of customer identifying preamble sequences.

Figure 6A:
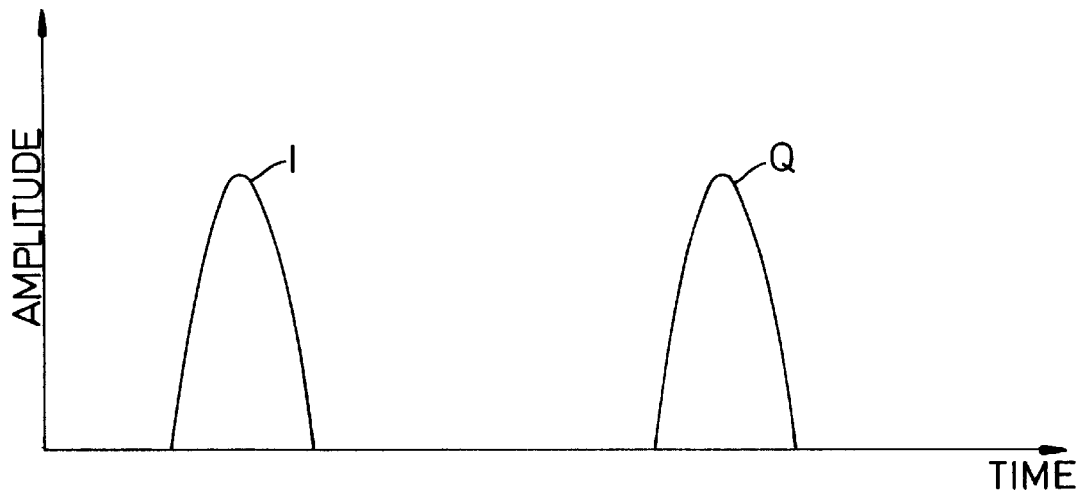
FIGS. 6a and 6b illustrate a pulse transmission technique for determining the characteristics of a dispersive channel in the network of FIG. 1.
Figure 6B:
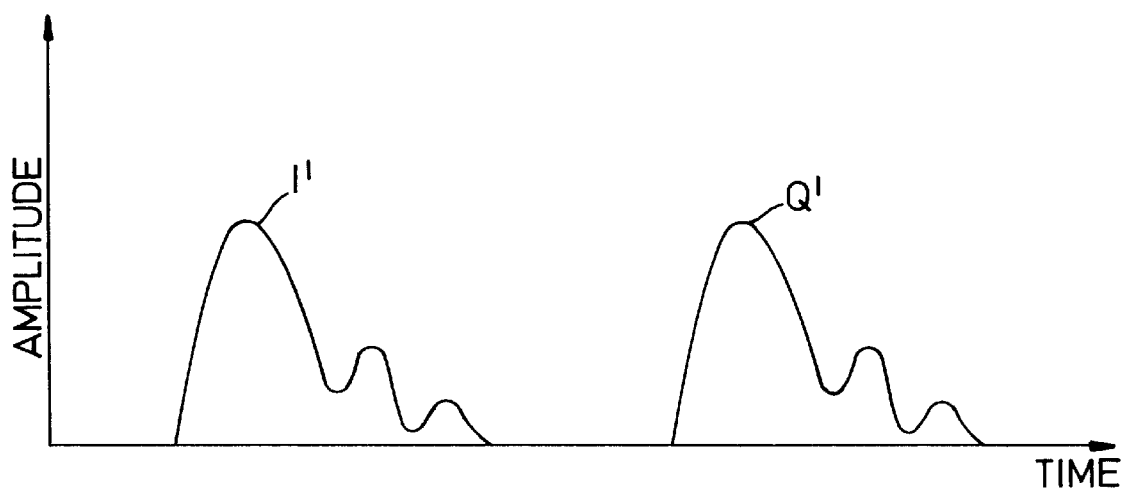

Referring now to FIGS. 6a and 6b, these illustrate a method of determining the transmission characteristics of a dispersive channel between a customer terminal and the access node whereby to perform equalization. In response to a marshalling command signal from the access node, the customer terminal transmits a sequence of two pulses (FIG. 6a) separated by a predetermined time period, typically equivalent to sixteen symbols. These pulses comprise a first in phase pulse (the I-pulse) and a second quadrature pulse (the Q-pulse). The I and Q impulses are generated in response to a command received from the access node or base station during a control frame. The impulses are transmitted during the marshalling procedure in cell slot E (FIG. 3) of the ATM frame. This may be performed e.g. every few seconds, and does not thus require any significant bandwidth as no dedicated time slots need to be allocated for this purpose.

When received at the access node, each pulse (FIG. 6b) has been degraded as a result of the path dispersion into a broadened main pulse (the I'-pulse and the Q'-pulse) each followed by a series of smaller pulses or echoes resulting from multipath transmission. The relative amplitudes of the pulses of each received pulse set are measured and provide data for calculating a set of channel coefficients which are transmitted to and are stored at the customer terminal in a second area of the channel data memory.

The channel impulse response is determined using a zero forcing algorithm. In the operation of this algorithm it is assumed that an impulse response has been obtained and is frequency and phase corrected so that the cursor sample phase is zero. The response samples are labelled x1(cursor), x2, x3, . . . The algorithm can be expressed directly in terms of these samples, but we have found it more convenient to compute the reciprocal of the cursor sample and multiply the impulse response samples by this value to give a scaled impulse response:

x1'=1.0, x2', x3', . . .

The equalizer has a total of M coefficients labelled h1, h2, h3, . . . hM, and the cursor coefficient is fixed at 1.0. When fed with the scaled impulse response, the first sample from the equaliser will be h1x1"=1.

We now make the next M−1 output samples equal to zero by computing suitable values for the coefficients h2 to hM.

The second output sample is y2=h1.x2'+h2.x1' so y2 can be made equal to zero by putting h2=−x2'.

The third output sample is y3=h1.x3'+h2.x2'+h3.x1' so y3 is made equal to zero by putting h3=−(x3'+h2.x2')

Similarly, y4 is equated to zero by putting h4=−(x4'+h2.x3'+h3.x2') and so on.

When the equalizer coefficients are set to these values, the impulse response of the whole system becomes a non-zero cursor sample followed by (M−1) zero outputs.

We have implemented the coefficient calculation as a recursive filter in which the feedback coefficients are the negated impulse response samples excluding the initial 1.0. An impulse is fed into this recursive filter and the output is the required set of values for the equalizer coefficients. Implemented in this way, a fully regular algorithm requires $(M-1)^2$ multiplications and additions. If however, the initial zeros in the recursive filter stores are taken into account, then an irregular algorithm can be used requiring only 1+2+ . . . +M−1=M(M−1)/2 multiplications and additions. Thus, a length six adaptive filter requires twenty five multiplications and additions for the regular algorithm or only fifteen for the irregular algorithm.

The algorithm thus requires the following steps for a length six filter:

1. Latch the two '1' cursors a and b and compute angle (a) and angle (b).
2. Load angle (a) and angle rate β=(angle (b)−angle(a))/16 into the rotator control.
3. Rotate six samples starting with cursor a, incrementing by β at each symbol.
4. Load angle (b) into the rotator control.
5. Rotate six samples starting with cursor b, incrementing by β at each symbol.
6. Average these two impulse responses.
7. Compute the reciprocal of the first sample of the result.
8. Multiply the five trailing samples by the reciprocal.
9. Using these five values in the recursive filter algorithm, compute the five trailing equalizer coefficients.

The accuracy of the coefficients in the above procedure is directly proportional to the accuracy of the initial reciprocal calculation which scales the first impulse response sample to 1. As any errors have a cumulative effect, the target error for this reciprocal calculation should be less than 0.5%.

The demodulated phase difference between the received I'-pulse and the subsequent Q'-pulse is measured and is used to provide a measure of the frequency offset of the channel. The two received pulses should be $\pi/2$ or 90° different in phase and any deviation from this is assumed to result from the channel frequency offset. If for example the two pulses are transmitted sixteen symbols apart, then the frequency (or phase) offset per symbol is given by, $$\text{Offset/symbol} = (\text{Phase difference} - 90°)/16 \qquad (1)$$

This information is also transmitted to and stored at the customer station in the channel data memory associated with the adaptive filter. The taps of this filter are fed with the stored data to provide an inverse of the channel over which traffic is transmitted to the central station or access node thus performing equalization of signals transmitted to the access node from the customer terminal.

Figure 7:
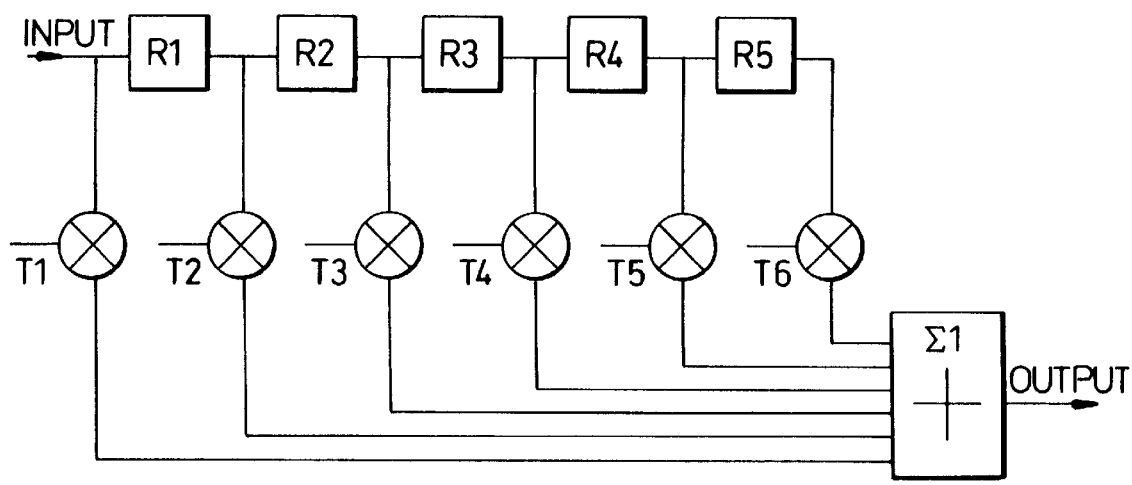
FIG. 7 shows the general construction of an adaptive filter for use in a customer terminal of the network of FIG. 1.

The construction of the adaptive filter or pre-equalizer is shown in FIG. 7 and comprises a complex finite impulse response (FIR) filter consisting of a sequence of registers R1 to R5 and corresponding taps or complex multipliers T1 to T6. The outputs from the taps are summed in a summation circuit $\Sigma 1$. The taps are loaded initially with values calculated from equation (1) above. The first time, the coefficients are calculated on the unequalized signal. Subsequently, the pre-equalizer is enabled during transmission of the pair of impulses and the received signal is thus already partially equalized. The coefficients are calculated in the same manner whether or not the pre-equalizer was enabled, but the resultant coefficients are used differently as is discussed above. In both cases the coefficients are downloaded to the respective outstation.

Equalization is performed on both the down link and the up link, but it is only the up link that is pre-equalized, i.e. pre-distorted, at the transmitter. The down link equalization is performed at the outstation. The first time, i.e. on set-up of the system or after a reset, the new coefficients are used as the pre-equalizer taps. Subsequently, the new coefficients are scaled, as discussed above, by dividing by four and these scaled coefficients are then added to the corresponding previous values. For example, if the tap T1 coefficient is calculated as 30 at start-up, this is the value that is loaded into the pre-equalizer. At the next iteration, the signal is already pre distorted so that the error is reduced and a smaller value, e.g. 10 is calculated. This new value is divided by four and the remainder is discarded to give an integer value of 2 and this is added to the previously calculated value of 30 to give 32, this latter value being used as the new coefficient for tap T1. This procedure is repeated at each coefficient calculation, the error decreasing at each repetition. The iteration can be continued until no further improvement is obtained.

Although the communications system has been described above with particular reference to a cable TV system, it will be appreciated that it is by no means limited to that particular application and that it is of general application to systems, e.g. distribution networks, employing ATM transmission to and from terminal stations.

We claim:

1. A method of performing channel equalization in a distribution telecommunications system in which a plurality of outstations are coupled to a central station via a distribution network and in which signals are transmitted between the central station and the outstations in an asynchronous transfer mode (ATM) format, the method including transmitting from a said outstation pulse sequences each comprising a first in-phase pulse and a second quadrature pulse, determining from the corresponding pulses received at the central station a measure of the channel distortion in the path between the central station and the outstation, determining from the timing or phase offset of the corresponding pulses received at the central station a measure of the frequency offset of the path between the central station and the outstation, and transmitting data corresponding to those measurements to the outstation whereby to effect equalization of signals transmitted from the outstation to the central station.

2. A method as claimed in claim 1, wherein said pulse sequences are transmitted by the outstation in response to a marshalling command transmitted by the base station.

3. A method as claimed in claim 2, wherein said in-phase and quadrature pulses are transmitted each in an allocated slot in an ATM frame.

4. A method as claimed in claim 3, wherein said channel distortion is determined in the form of coefficients, and wherein said coefficients are applied to an adaptive filter provided at the outstation.

5. A method as claimed in claim 4, wherein said coefficients are used to determine corresponding new coefficients via an iterative procedure.

6. A method as claimed in claim 1, wherein signalling between the outstation and the central station employs a differential quadrature phase shift keying (DQPSK) protocol.

7. An arrangement for performing channel equalization in a distribution telecommunications system in which a plurality of outstations are coupled to a central station via a distribution network, the arrangement including means for determining for each said outstation a measure of the channel distortion of the path between that outstation and the central station, storage means disposed at each said outstation for storing data corresponding to said measured dispersion and frequency offset for that outstation, and means disposed at the outstation for effecting from said stored data equalization of signals transmitted from that outstation to the central station by pre distortion of said transmitted signals.

8. An arrangement as claimed in claim 7, wherein each outstation has means for transmitting to the central station a pulse sequence comprising a first in-phase pulse and a second quadrature pulse, and in which said measurement means is adapted to determine the time/phase relationship of the pulses received at the central station whereby to compute the frequency offset of the path between the outstation and the central station.

9. An arrangement as claimed in claim 8, wherein the first and second pulses are transmitted by the outstation as part of a marshalling procedure.

10. An arrangement as claimed in claim 9, wherein the equalization means comprises an active filter disposed at the outstation.

11. An arrangement as claimed in claim 10, and incorporating means for loading said active filter with coefficients corresponding to said channel distortion and frequency offset.

* * * * *